(No Model.) 2 Sheets—Sheet 1.
H. N. NORTON.
APPARATUS FOR MANUFACTURE OF TIN PLATE.
No. 535,397. Patented Mar. 12, 1895.
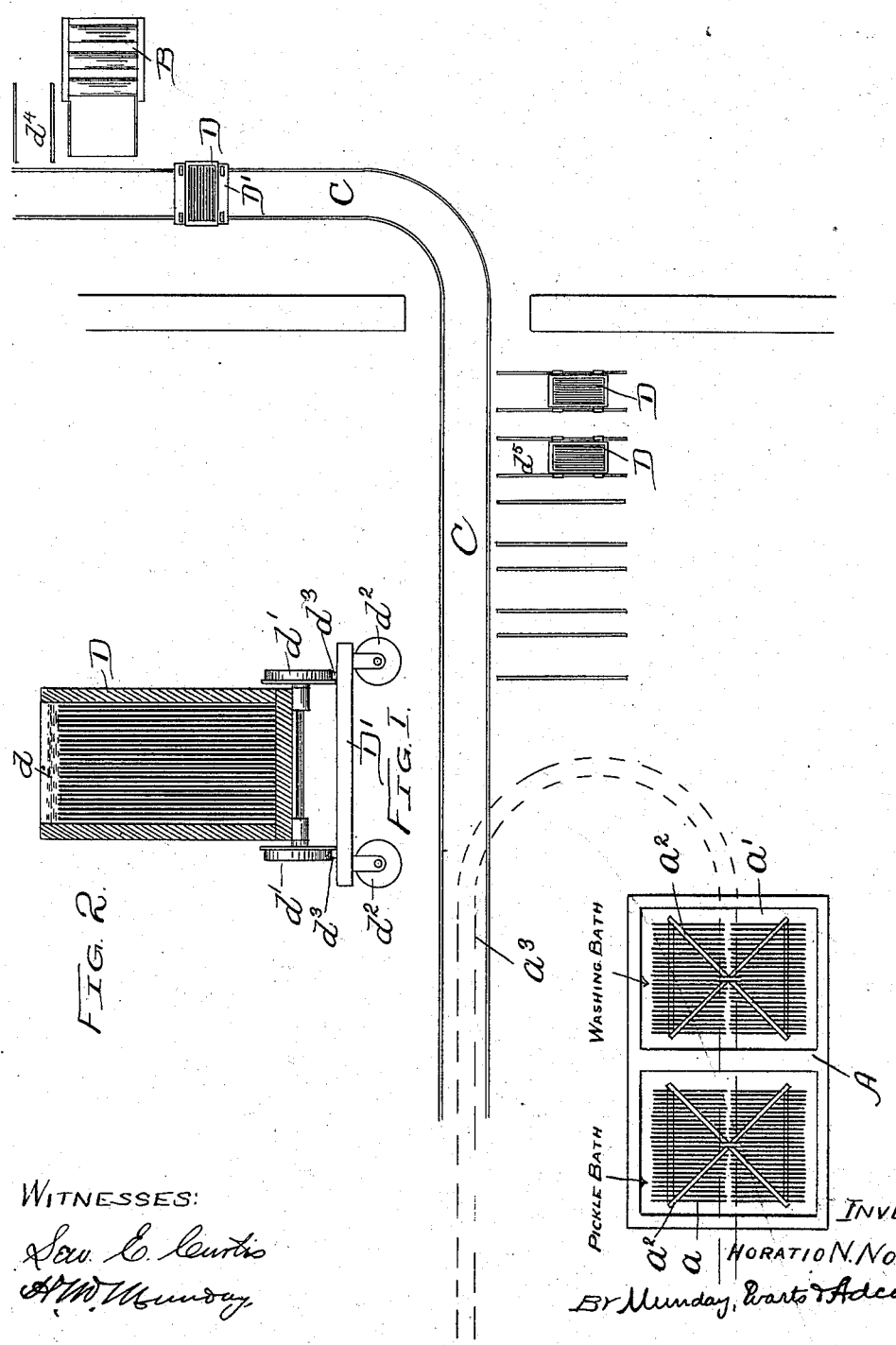

(No Model.) 2 Sheets—Sheet 2.
H. N. NORTON.
APPARATUS FOR MANUFACTURE OF TIN PLATE.
No. 535,397. Patented Mar. 12, 1895.
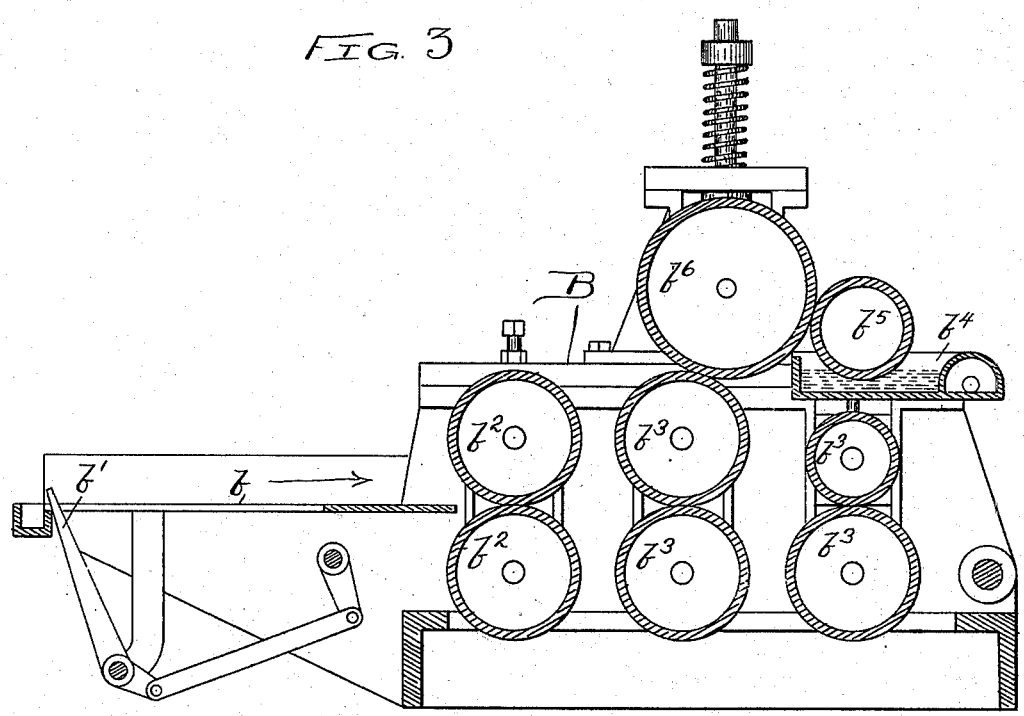
WITNESSES:
Sew. E. Curtis
H. M. Munday,
INVENTOR:
HORATIO N. NORTON
By Munday, Evarts & Adcock.
HIS ATTORNEYS.

UNITED STATES PATENT OFFICE.

HORATIO N. NORTON, OF OAK PARK, ASSIGNOR TO THE NORTON BROTHERS, OF CHICAGO, ILLINOIS.

APPARATUS FOR MANUFACTURE OF TIN-PLATE.

SPECIFICATION forming part of Letters Patent No. 535,397, dated March 12, 1895.

Application filed June 18, 1894. Serial No. 514,911. (No model.)

*To all whom it may concern:*

Be it known that I, HORATIO N. NORTON, a citizen of the United States, residing in Oak Park, in the county of Cook and State of Illinois, have invented a new and useful Improvement in Apparatus for Manufacturing Tin-Plate, of which the following is a specification.

My invention relates to the art of making tin plate.

Heretofore in manufacturing tin plate, after the black sheets have been pickled to remove the scale or oxide from their surface and thoroughly washed to remove the acid left upon them from the pickling bath, it has been customary to place the pickled sheets in tanks of water in which they are submerged to prevent their surfaces becoming again rusted or tarnished until they are ready to be removed to the tinning plant, which is generally located at a considerable distance from the pickling and washing plant or mechanism, and most frequently in a separate building, after which the sheets are taken from the water tank and piled upon the truck and wheeled or conveyed to the tinning plant where they are dried and fluxed and tinned, the sheets being first sorted to select out and reject those that are not sufficiently bright or well coated. In this intervening handling of the sheets on an open truck considerable time necessarily elapses after the pickled sheets are taken from the protecting tank of water before they can receive the protecting coat of flux or tin; and consequently the sheets, or some of them, frequently become more or less oxidized or tarnished before tinning, thus resulting in more or less defective work, and frequently rendering necessary the re-pickling of many sheets.

The object of my invention is to provide an apparatus by which this difficulty or objection may be entirely overcome or avoided, and the surfaces of the sheet completely protected from oxidation from the time they are first pickled and washed until they are fluxed or tinned, and also to dispense with the labor of one man, the one heretofore employed at the pickling plant to assort the sheets and reject the improperly pickled sheets. To accomplish this new, important and valuable result I combine the sheet pickling and washing plant or mechanism directly with the fluxing or tinning plant or mechanism by a connecting conveyer for the sheets operating at the same time to keep the sheets immersed in water or other liquid that will preserve their washed and cleaned or pickled surfaces from oxidation. The sheet conveyer may be of any suitable kind or construction known to those skilled in the art that will serve to perform this double function of conveying the sheets and of preserving or protecting their surfaces from oxidation while being conveyed and handled or delivered into the fluxing device or machine of the tinning plant. The conveyer or carrier which I prefer to employ in my new apparatus is however that indicated in the drawings, and consists of a series of wheeled trucks furnished each with a liquid tight tank or receptacle for holding the sheets and a protecting supply of water in which the sheets are submerged as they are taken from the rack of the washing mechanism, while they are being conveyed from the pickling and washing plant to the tinning plant, and while they are being delivered into the fluxing device or mechanism of the tinning plant, or stored preparatory thereto.

In the accompanying drawings, forming a part of this specification, I have illustrated at Figure 1 in plan an apparatus embodying my invention. Fig. 2 is a detail section of the tank truck. Fig. 3 is a detail vertical sectional view of the drying and fluxing mechanism of the tinning plant.

In said drawings A represents the pickling and washing plant, the same being of the usual construction known to those skilled in the art, and needing no detailed description.

In the drawings $a$ indicates the tank containing the dilute acid for pickling, $a'$ the tank containing the water for washing the sheets after being pickled, and $a^2$ $a^2$ the racks in which the sheets are held and supported and moved up and down first in the pickling bath and then in the washing bath and then swung to one side as indicated in the dotted lines $a^3$ to remove the washed and pickled sheets from the rack and put other sheets into the rack.

B represents the tinning plant, or rather the fluxing mechanism of the tinning plant. This, like the pickling and washing plant, may be of any suitable construction known to those skilled in the art. The fluxing mechanism B, as indicated in the drawings, comprises a series of steam heated drying and fluxing rolls between which the sheets are passed one by one and by which the water or moisture on the surfaces of the sheet is driven off, and the sheets coated with palm oil or other flux preparatory to the immersion of the same in the tinning pot.

As shown in Fig. 3 $b$ is the feed table; $b'$, the feeder arm; $b^2$ $b^2$, the drying rolls; $b^3$ $b^3$ $b^3$ $b^3$, the fluxing rolls; $b^4$, the palm oil or flux pot; $b^5$, the flux feed roll, and $b^6$ the transfer roll. I do not claim this special drying and fluxing mechanism as my invention, the same being, as I understand, the invention of Edwin Norton and the subject of his pending application, Serial No. 514,899, filed of even date with this application.

C is the passage or way leading from the pickling and washing plant to the fluxing or tinning mechanism.

D is the sheet carrier or conveyer by which the sheets are protected from oxidation by immersion in water or other fluid and also conveyed from the pickling or washing plant A to the fluxing or tinning plant B, this carrier or conveyer being supplied with water $d$ in the receptacle for containing the sheets, so that the sheets will be immersed in the water and thus protected from oxidation. The water containing sheet conveyer or receptacle D is provided with wheels $d'$, and is preferably mounted on a transfer truck D' the wheels $d^2$ of which run upon the rails or tracks $c$ with which the way or passage C is preferably provided. The truck D' is furnished with rails $d^3$ which register with the rails $d^4$ and $d^5$ to permit any one of the series of carriers or trucks D to be taken from the storage tracks $d^5$ and upon the transfer track D' and thence transferred to the unloading or delivery track $d^4$ where the sheets are fed one by one into the drying and fluxing machine. By employing a series of these trucks D and a series of storage tracks $d^5$ therefor I am enabled to keep a reserve supply of pickled sheets on hand to insure the continuous operation of the tinning plant without interference or stoppage by reason of its combination or connection with the pickling plant; and also to maintain a reserve supply of empty tank trucks to insure the steady, continuous and proper operation of the pickling plant without stoppage or interference by reason of its dependence upon and direct connection or combination with the tinning plant; and the same handling of the sheets one by one to feed them to the fluxing device also suffices to sort out and reject the imperfectly pickled sheets thus enabling me to dispense entirely with the workman heretofore constantly employed at the pickling plant to sort the sheets.

I claim—

1. In tin plate manufacturing apparatus, the combination with a pickling and washing plant or mechanism having racks for holding and moving the sheets in a body up and down in the pickling tank and washing tank of a fluxing and tinning plant or mechanism and a water-containing sheet conveyer for conveying the pickled and washed sheets from the pickling and washing mechanism to the fluxing mechanism and protecting the same from oxidation, said sheet conveyer being constructed and adapted to permit the sheets to be assorted and the imperfect sheets rejected as they are fed therefrom one by one to the fluxing mechanism substantially as specified.

2. The combination with a pickling and washing plant, of a fluxing and tinning plant, a sheet conveyer consisting of a water tight receptacle or tank for holding the sheets, mounted upon wheels, said tank being partially filled with water or other liquid to protect the surfaces of the sheets from oxidation while being conveyed and handled after pickling and before fluxing or tinning, substantially as specified.

3. The combination with a pickling and washing plant of a tinning plant and a series of movable tanks containing water for receiving the washed and pickled sheets, and storing and conveying them when required to the tinning plant, substantially as specified.

4. In a tin plate manufacturing apparatus the combination with a pickling and washing plant, of a tinning plant, a truck or way connecting said plants, a transfer truck, and a series of movable tank trucks containing water and adapted to hold a reserve supply of washed and pickled sheets, substantially as specified.

5. In a tin plate manufacturing apparatus the combination with a pickling and washing plant, of a tinning plant, a truck or way connecting said plants, a transfer truck, and a series of movable tank trucks adapted to hold a reserve supply of washed and pickled sheets, a series of storage tracks, a delivery truck at the tinning plant, and tracks for said transfer truck, substantially as specified.

HORATIO N. NORTON.

Witnesses:
ARTHUR L. FANNING,
H. M. MUNDAY.